(12) United States Patent
Oesch

(10) Patent No.: US 6,612,209 B2
(45) Date of Patent: *Sep. 2, 2003

(54) FOOD PROCESSING APPARATUS

(75) Inventor: Shem D. Oesch, Bakersfield, CA (US)

(73) Assignee: Grimmway Enterprises, Inc., Bakersfield, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/296,824

(22) Filed: Apr. 22, 1999

(65) Prior Publication Data

US 2003/0037645 A1 Feb. 27, 2003

(51) Int. Cl.$^7$ .................................................. B26D 3/00
(52) U.S. Cl. ............................ 83/13; 83/419; 83/425.2; 83/435.2; 83/409.1; 198/803.14
(58) Field of Search ................................ 83/419, 425.2, 83/435.2, 409.2, 409.1, 412, 13, 932, 732; 198/867.12, 803.14, 803.15, 397.06

(56) References Cited

U.S. PATENT DOCUMENTS

| | | | | |
|---|---|---|---|---|
| 126,162 A | * | 4/1872 | Stowell | 83/435.2 |
| 1,044,880 A | * | 11/1912 | Devlin et al. | 83/435.2 |
| 1,070,126 A | * | 8/1913 | Ford | 83/409.1 |
| 1,246,110 A | * | 11/1917 | Killingsworth | 83/409.1 |
| 2,800,939 A | * | 7/1957 | Vance | 83/409.1 |
| 2,858,866 A | * | 11/1958 | Hendry | 83/409.1 |
| 3,605,983 A | | 9/1971 | Oldershaw | 198/30 |
| 3,621,900 A | | 11/1971 | Rood | 146/83 |
| 3,669,240 A | | 6/1972 | Ross | 198/31 AA |
| 3,738,258 A | * | 6/1973 | Goodale | 83/409.1 |
| 3,764,717 A | * | 10/1973 | Rood | 83/409.1 |
| 3,791,513 A | | 2/1974 | Barlow | 198/33 AA |
| 3,823,815 A | | 7/1974 | Bretten et al. | 198/33 R |
| 4,005,625 A | * | 2/1977 | Brochu et al. | 83/425.2 |
| 4,367,675 A | | 1/1983 | Boots | 99/546 |
| 4,831,925 A | | 5/1989 | Zanetti | 99/636 |
| 5,178,256 A | | 1/1993 | Anderson et al. | 198/384 |
| 5,320,033 A | | 6/1994 | Chapman et al. | 99/636 |
| 5,623,868 A | | 4/1997 | McKenna | 99/636 |
| 5,974,925 A | * | 11/1999 | Lindee et al. | 83/409.1 |

FOREIGN PATENT DOCUMENTS

| | | | |
|---|---|---|---|
| DE | 3807229 A1 | 9/1989 | B07B/13/04 |
| SU | 1194376 A | 11/1985 | A23N/15/04 |
| SU | 1463416 A1 | 3/1989 | A23N/15/04 |

* cited by examiner

Primary Examiner—Kenneth E. Peterson
Assistant Examiner—Omar Flores-Sánchez
(74) Attorney, Agent, or Firm—Townsend and Townsend and Crew LLP

(57) ABSTRACT

A food processing apparatus for conveying food items such as carrots and the like to a cutter comprises a conveyor having a plurality of pockets for receiving the food items. The conveyor moves in a conveyor direction to the cutter for topping, tailing, or cutting the food items. A stationary feed chute is disposed adjacent a side of the conveyor for transferring the food items to the conveyor. The apparatus is disposed at a compound angle measured from the horizontal plane such that the food items are transferred from the feed chute to the conveyor by gravity. Food items which are not received into the pockets of the conveyor are carried by their momentum of feed to fall off from the conveyor by gravity in a direction away from the cutter, and are collected for return to the feed chute. This decreases the amount of misfed food items from reaching the cutter and the amount of uncut or improperly cut food items at the output of the cutter. Guiding the food items during the transfer from the feed chute to the conveyor at an angle having a component opposite to the conveyor direction helps align the food items with the pockets on the moving conveyor to increase the percentage of food items that are properly received into the pockets.

38 Claims, 2 Drawing Sheets

FOOD PROCESSING APPARATUS

BACKGROUND OF THE INVENTION

This invention relates generally to food processing and, more particularly, to apparatus and methods for conveying food items such as carrots to a cutter.

Apparatus for topping and tailing vegetables such as carrots employ a conveyor for moving the vegetables to one or more cutters. The conveyor typically includes pockets or slots for receiving the vegetables that are oriented in a specific manner with respect to the cutter. Some apparatus employ cutters that cut each piece of vegetable into two or more pieces of shorter lengths to produce, for example, baby carrots. To be cost effective, the conveyor typically operates at a high speed. The ability to orient quickly the carrots into the pockets of the conveyor becomes a limiting factor on the feed rate of carrots to the cutter. When some of the carrots are not oriented properly, they will pass through the apparatus without being topped or tailed or cut into the proper sizes. For instance, the carrots may be oriented longitudinally instead of transversely toward the cutter and pass through the cutter without being cut or cut in a longitudinally direction into thinner rather than shorter pieces. Some apparatus employ elaborate and complex mechanisms for orienting the carrots, which typically slow down the cutting process and are prone to malfunctioning.

SUMMARY OF THE INVENTION

The present invention provides apparatus and methods for conveying food items such as carrots to a cutter for cutting which reduce the production of uncut or improperly cut food items and increase the output of properly cut food items. It does so by simple tilting of the conveyor so that food items which are not properly received into pockets of the conveyor tend to fall off from the conveyor by gravity away from the cutter and into a recycle area from which they are returned to a feed line to be fed to the conveyor again. The food items are fed to the conveyor, preferably assisted by gravity, at an angle having a component opposite to the direction of the conveyor selected to increase the likelihood that they will be properly aligned with and received into the pockets moving in the conveyor direction. In this way, the invention avoids or at least minimizes the production of uncut or improperly cut food items at the output of the cutter without employing complex mechanisms or decreasing the speed of the conveyor.

In accordance with an aspect of the present invention, a food processing apparatus for conveying food items to a cutter for cutting comprises a conveyor having a plurality of pockets for receiving food items and configured to move the food items in a conveyor direction to a cutter. A stationary feed chute is disposed adjacent a side of the conveyor and is disposed at a chute angle measured from a horizontal plane for transferring the food items downward to the conveyor by gravity. The conveyor is disposed at a conveyor angle measured from the horizontal plane. The conveyor angle is counter-clockwise relative to the conveyor direction. The conveyor is substantially unobstructed along another side opposite from the stationary feed chute so that food items which are not received into the pockets of the conveyor tend to fall off from the conveyor by gravity. In specific embodiments, the conveyor angle is about 15°–70°, and more desirably about 40°–45°.

In some embodiments, the pockets in the conveyor are oriented generally in a transverse direction which is substantially perpendicular to the conveyor direction. The conveyor is further disposed such as the conveyor direction is at a transverse angle measured from the horizontal plane, and the transverse angle is counter-clockwise relative to the transverse direction. In specific embodiments, the transverse angle is about 15°–45°, and more desirably about 30°. The feed chute in some embodiments includes a guide member for guiding the food items to the conveyor at a guide angle measured from the transverse direction. The guide angle is counter-clockwise relative to a downward direction which points generally downward and is substantially perpendicular to a plane on which both the conveyor direction and the transverse direction lie. In specific embodiments, the guide angle is about 4°–10°.

In accordance with another aspect of the invention, an apparatus for conveying food items to a cutter comprises a conveyor having a plurality of slots for receiving food items and configured to move the food items upward in a conveyor direction to a cutter. The plurality of pockets are oriented generally in a transverse direction which is substantially perpendicular to the conveyor direction. The food items are received into and aligned in the pockets generally in the transverse direction. A stationary feed chute is disposed adjacent a side of the conveyor for transferring the food items to the conveyor. The conveyor is disposed at a transverse angle measured from a horizontal plane. The transverse angle is counter-clockwise relative to the transverse direction so that food items which are not received into the pockets of the conveyor tend to fall off from the conveyor by gravity. In specific embodiments, the transverse angle is about 15°–45°, and more desirably about 30°.

In accordance with another aspect of this invention, an apparatus for conveying food items to a cutter comprises a conveyor having a plurality of pockets for receiving food items and configured to move the food items in a conveyor direction to a cutter. The plurality of pockets are oriented in a pocket direction which is nonparallel to the conveyor direction. The food items are received into and aligned in the pockets generally in the pocket direction. The apparatus further comprises means for transferring the food items to the conveyor. The conveyor is disposed at an angle measured from a horizontal plane so that food items which are not received into the pockets tend to fall off from the conveyor by gravity away from the cutter. In specific embodiments, the angle of the conveyor is selected so that food items which are not received into the pockets of the conveyor tend to fall off from the conveyor by gravity generally in a direction which is opposite from the conveyor direction or in a direction which is substantially parallel to the pocket direction.

In accordance with yet another aspect of the invention, a method for conveying food items on a conveyor having a plurality of pockets to a cutter for cutting comprises transferring food items in a feed direction to the pockets of the conveyor. The conveyor is moved in a conveyor direction to the cutter which is nonparallel to the feed direction. The conveyor is tilted at an angle measured from a horizontal plane so that food items which are not received into the pockets tend to fall off from the conveyor by gravity away from the cutter. In some embodiments, the method further comprises guiding the food items into the plurality of pockets of the conveyor at a guide angle measured from a pocket direction along which the pockets are oriented. The guide angle is counter-clockwise relative to a downward direction which points generally downward and is substantially perpendicular to a plane on which both the conveyor direction and the pocket direction lie.

DESCRIPTION OF THE SPECIFIC EMBODIMENTS

Figure 1:
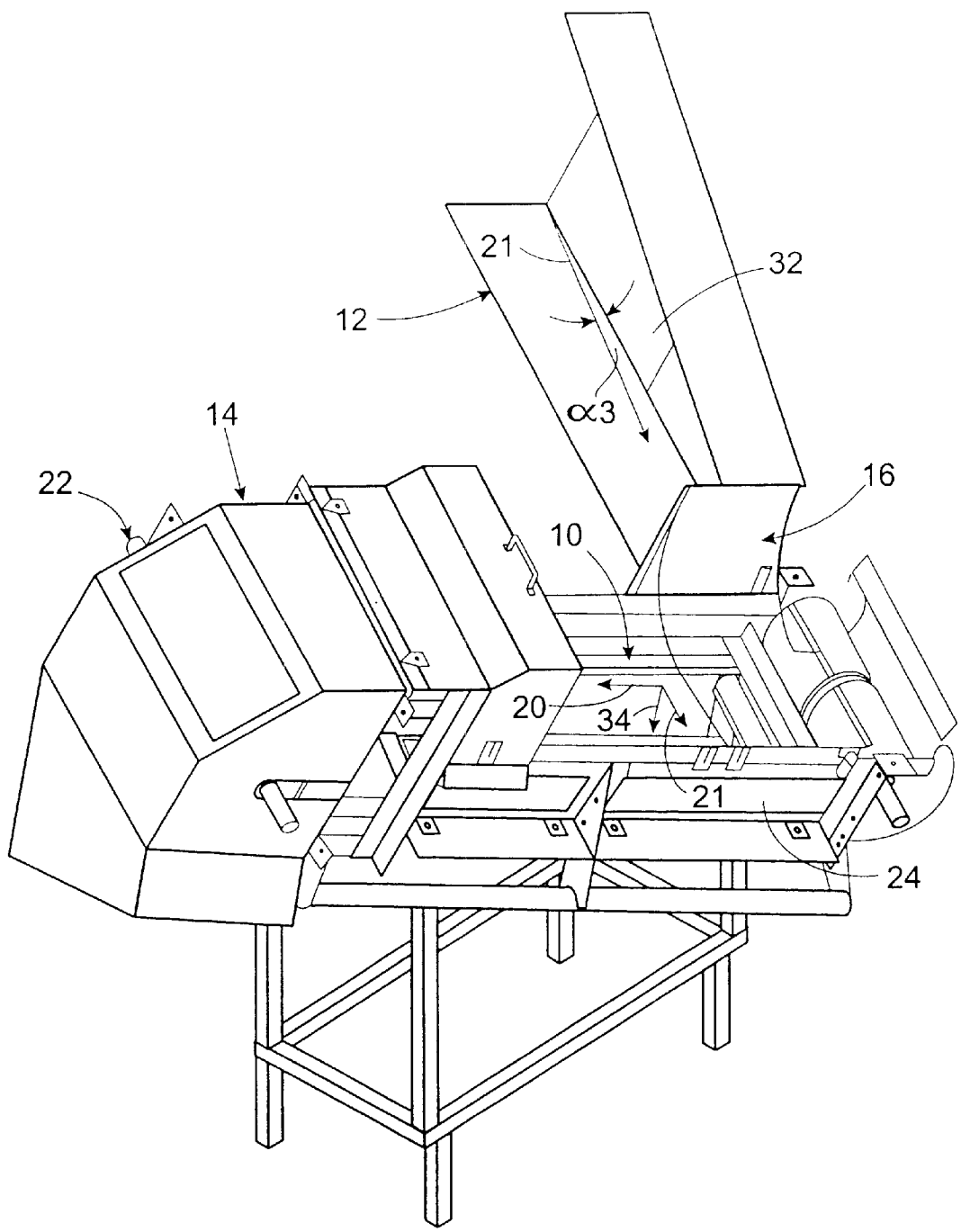
FIG. 1 is a perspective view of the food processing apparatus in accordance with an embodiment of the present invention.
Figure 1:
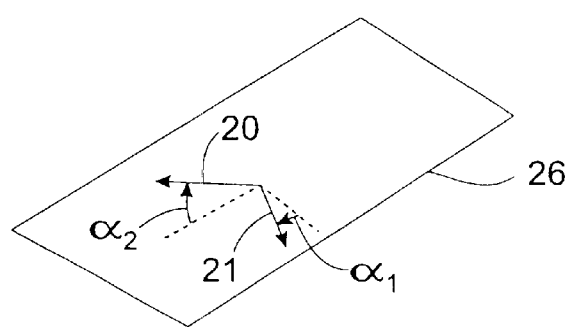
Figure 2:
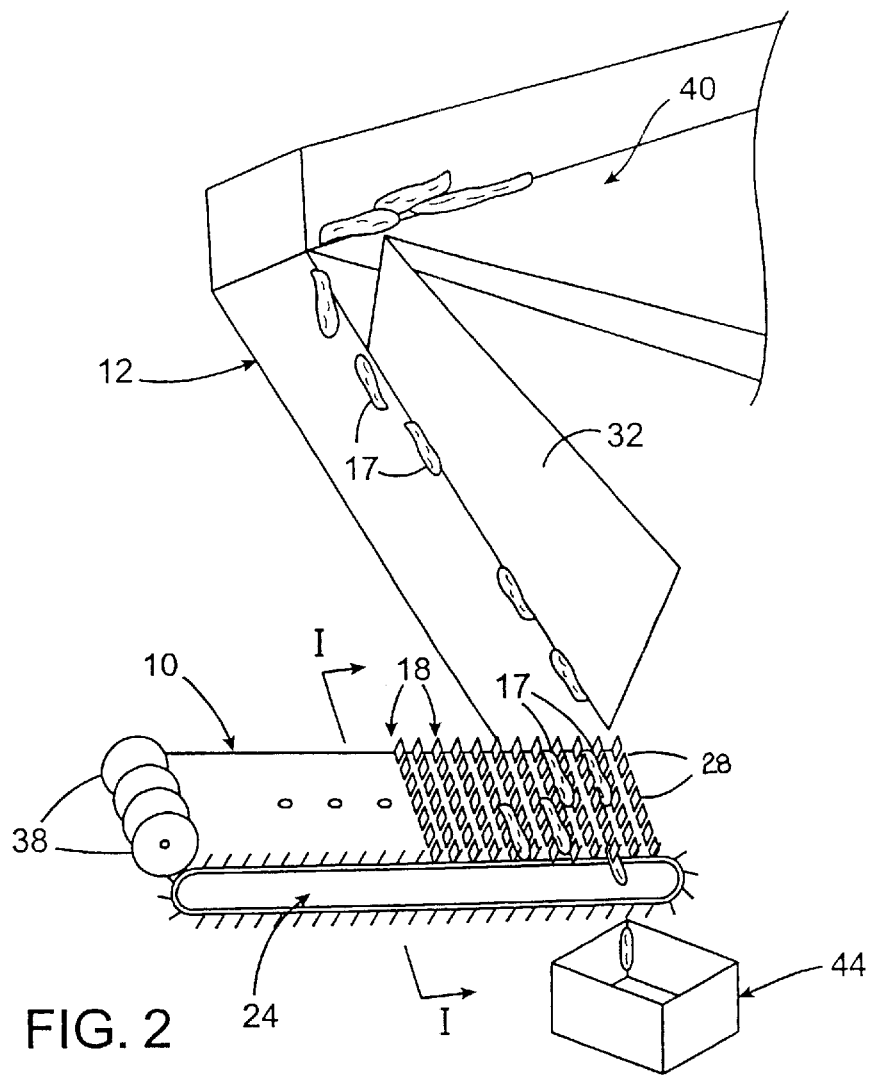
FIG. 2 is a schematic view of the food processing apparatus of FIG. 1 illustrating the movement of food items in the apparatus.
Figure 3:
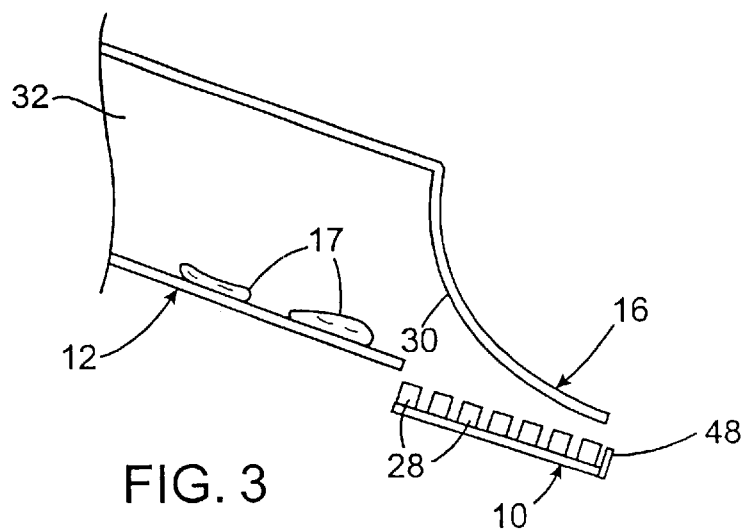
FIG. 3 is a cross-sectional view of the food processing apparatus of FIG. 2 along I—I illustrating the feed chute, the transition chute, and the conveyor.

In the food processing apparatus of FIG. 1, a conveyor 10 receives food items such as carrots from a feed chute 12 and conveys them to a cutter 14 for cutting the carrots. As an example, carrots are used primarily in the following discussion, but it is understood that the present invention is not so limited. A transition chute 16 is provided in the entry region where the carrots pass from the feed chute 12 to the conveyor 10 to guide the carrots 17 into a plurality of pockets 18 of the conveyor 10, which are illustrated in FIG. 2. The conveyor 10 and the transition chute 16 are made transparent in FIG. 1 to show the other details of the apparatus. Further details of the conveyor 10 and the transition chute 16 are shown in FIG. 2 and FIG. 3.

As illustrated in FIGS. 1 and 2, the conveyor 10 moves in a conveyor direction 20 toward the cutter 14, and the pockets 18 are typically oriented in a pocket direction or transverse direction 21 which is generally perpendicular to the conveyor direction. The carrots 17 are transferred from the feed chute 12 to the conveyor 10 generally in the pocket direction 21. The conveyor 10 in this embodiment is an endless conveyor driven to rotate by a conveyor motor 22 on a frame 24 toward the cutter 14 in an upper path and returning to the region of the feed chute 12 in a lower path. The conveyor 10 typically has a planar configuration between the feed chute 12 and the cutter 14.

The conveyor 10 is tilted relative to a horizontal plane 26. In the embodiment shown in FIGS. 1–3, the entire food processing apparatus is tilted relative to the horizontal plane 26 by a compound angle which is formed by two angles. The first angle is a conveyor angle al which is measured from the horizontal plane 26 and is counter-clockwise relative to the conveyor direction 20. That is, an observer looking in the conveyor direction 20 of the conveyor 10 will see a rotation of the conveyor 10 and the pocket direction 21 from the horizontal plane 26 in the counter-clockwise direction until the pocket direction 21 makes an angle equal to the conveyor angle $\alpha_1$ with the horizontal plane 26. The second angle is a pocket angle or transverse angle $\alpha_2$ which is also measured from the horizontal plane 26 and is counter-clockwise relative to the pocket direction 21. That is, an observer looking in the pocket direction 21 will see a rotation of the conveyor 10 and the conveyor direction 20 from the horizontal plane 26 in the counter-clockwise direction until the conveyor direction 20 makes an angle equal to the pocket angle $\alpha_2$ with the horizontal plane. Because the second rotation of the conveyor 10 takes place relative to the pocket direction 21, the second rotation does not change the conveyor angle $\alpha_1$ between the pocket direction 21 and the horizontal plane 26.

Alternatively, the order of the two rotations may be reversed. That is, the conveyor 10 can be first rotated counter-clockwise relative to the pocket direction 21 until the conveyor direction 20 makes an angle equal to the pocket angle $\alpha_2$ with the horizontal plane 26. The conveyor 10 is then rotated counter-clockwise relative to the conveyor direction 20 until the pocket direction 21 makes an angle equal to the conveyor angle $\alpha_1$ with the horizontal plane 26. Because the second rotation of the conveyor 10 takes place relative to the conveyor direction 20, the second rotation does not change the pocket angle $\alpha_2$ between the conveyor direction 20 and the horizontal plane 26. Generally, when an object is rotated by multiple angles relative to a fixed coordinate system (e.g., a Cartesian coordinate system), the order of the rotations will affect the final orientation of the object. In the present embodiment, the conveyor angle $\alpha_1$ and the pocket angle $\alpha_2$ have been defined not with respect to a fixed Cartesian coordinate system but with respect to the conveyor direction 20 and the pocket direction 21, such that the orientation of the conveyor 10 is the same regardless of the order of the rotations.

As seen in FIGS. 1–3, the feed chute 12 is stationary with a fixed direction of feed for the carrots 17 and is rotated by the same angles $\alpha_1$ and $\alpha_2$ from the horizontal plane 26. The feed chute 12 in this embodiment is coupled with the conveyor frame 24 and is generally planar and parallel to the conveyor 10. The feed chute 12 is disposed at or near the top of the pocket dividers 28 which define the rows of pockets 18 on the conveyor 10. The height of the pocket dividers 28 is typically equal to or slightly larger than the maximum width of the carrots 17. In the embodiment shown, the height of the pocket dividers 28 is about 1–3 inches, and is typically about 2 inches.

The transition chute 16 is typically coupled with the feed chute 12 and/or the conveyor frame 24, and includes a convex surface 30 which guides the carrots 17 into the pockets 18 of the conveyor 10 to increase the percentage of carrots 17 received into the pockets 18. The transition chute 16 is flush with or spaced slightly above the pocket dividers 28 by a clearance. In a specific embodiment, the clearance between the transition chute 16 and the pocket dividers 28 is about 0–½ inch, and more desirably about ⅛ inch. The transition chute 16 may extend partially or completely across the width of the conveyor 10.

The feed chute 12 desirably includes a guide member 32, as best seen in FIG. 1, which is generally perpendicular to the bottom portion of the feed chute 12. The guide member 32 is desirably disposed at a guide angle $\alpha_3$ measured from the pocket direction 21. The guide angle $\alpha_3$ is counter-clockwise relative to a downward direction 34 which points generally downward and is substantially perpendicular to a plane on which both the conveyor direction 20 and the pocket direction 21 lie. In the embodiment shown, the conveyor direction 20 and pocket direction 21 define the plane of the conveyor 10. The guide member 32 directs the carrots 17 to pass from the feed chute 12 to the conveyor 10 at the guide angle $\alpha_3$ having a first component in the pocket direction 21 and a second component which is opposite to the conveyor direction 20. If the conveyor 10 were stationary, feeding the carrots 17 in the pocket direction 21 would cause the carrots 17 to align automatically with the pockets 18 which are oriented in the pocket direction 21. Because the conveyor 10 is moving in the conveyor direction 20, however, feeding the carrots 17 in a feed direction at the guide angle $\alpha_3$ having a second component opposite to the conveyor direction 20 will compensate for the movement of the conveyor 10 and produce better alignment of the carrots 17 with the pockets 18 as they move in the conveyor direction 20.

The cutter 14 may include one or more cutting blades arranged in any desired manner for topping, tailing, or cutting the carrots 17 into baby sizes. In the embodiment shown in FIG. 2, the cutter 14 includes a plurality of blades 38 spaced across the width of the conveyor 10 for cutting the carrots 17 in baby sizes. The pocket dividers 28 are spaced across the width of the conveyor 10 by at least as many spaces therebetween to accommodate the blades 38. These spaces between the pocket dividers 28 in a row are larger than the thickness of the blades 38 to avoid contact with the blades 38.

The conveyor 10 in this embodiment has a width that allows multiple carrots 17 to be positioned in a single row of pockets 18. The width of the conveyor 10 is typically about 12–24 inches, and more desirably about 18 inches. About 5–10 equally sized pocket dividers 28 are spaced evenly across the width of the conveyor 10. The conveyor 10 includes continuous rows of the pocket dividers 28 to define continuous rows of pockets 18 therebetween. For simplicity, only some of the rows of pockets 18 and pocket dividers 28 are shown in FIG. 2. The remaining rows are symbolically indicated by the round continuation symbol ( . . . ). Adjacent rows of pocket dividers 28 are typically spaced by a distance of about 1–4 inches, more desirably about 2 inches, to define the pockets 18 therebetween. As best seen in FIG. 3, the conveyor 10 includes a stationary backstop 48 on the side opposite from feed chute 12 to keep the carrots 17 that are received into the pockets 18 from sliding off. The backstop 48 typically runs the entire length of the conveyor 10, and has a height that is generally the same as the height of the pocket dividers 28 so that the conveyor 10 is substantially unobstructed above the backstop 48 and pocket dividers 28.

In operation, carrots 17 are fed from a feed conveyor 40 to the feed chute 12 and slide toward the conveyor 10 as illustrated in FIGS. 2 and 3. Because of the tilting of the feed chute 12 by the conveyor angle $\alpha_1$ and the pocket angle $\alpha_2$, the carrots 17 are generally aligned longitudinally against the guide member 32 to slide by gravity toward the conveyor 10. The guide angle $\alpha_3$ of the guide member 32 provides better alignment of the carrots 17 with the pockets 18 moving in the conveyor direction 20. Because the conveyor 10 is moving in a direction (conveyor direction 20) that is different from the direction of feed of the carrots 17 (generally along pocket direction 21 and skewed by guide angle $\alpha_3$), the change in the momentum of the carrots 17 as they come in contact with the conveyor 10 may tend to bounce the carrots 17. The transition chute 16 reduces the bouncing so that a larger percentage of the carrots 17 fall within the pockets 18 on the conveyor 10. Those carrots 17 which do not fall into the pockets 18 will be carried by the feed momentum and gravity across the width of the conveyor 10 into a recycle area 44, from which they are returned to the feed conveyor 40 and refed to the conveyor 10 via a recycle conveyor (not shown). Such carrots 17 tend to slide above the top of the pocket dividers 28 across the width of the conveyor 10 into the recycle area 44. To allow those carrots 17 to reach the recycle area 44, the conveyor 10 is substantially unobstructed above the top of the pocket dividers 28 along the side opposite from the feed chute 12. The tilting of the conveyor 10 by the conveyor angle $\alpha_1$ and the pocket angle $\alpha_2$ facilitates the collection and recycling of the carrots 17 that are not properly received into the pockets 18 of the conveyor 10, and decreases the amount of misfed carrots 17 from reaching the cutter 14. Those carrots 17 fall off from the conveyor 10 by gravity away from the cutter 14. This ensures that most of the carrots 17 that reach the cutter 14 are properly oriented and reduces the number of uncut or improperly cut carrots at the output of the cutter 14.

The selection of the conveyor angle $\alpha_1$ the pocket angle $\alpha_2$, and the guide angle $\alpha_3$ depends on various factors, including the shape and size of the conveyor 10 and pockets 18, the shape and size of the carrots 17 or other food items being processed, and the speed of the conveyor 10. The angles can be optimized for a particular configuration and operating conditions of the apparatus. Typically, the conveyor angle $\alpha_1$ is between about 15°–70°, the pocket angle $\alpha_2$ is between about 15°–45°, and the guide angle $\alpha_3$ is between about 4°–10°. In specific embodiments in which the conveyor speed is about 120–150 feet per minute, the conveyor angle $\alpha_1$ is between about 40°–45°, the pocket angle $\alpha_2$ is about 30°, and the guide angle $\alpha_3$ is between about 6°–8°.

Experiments were conducted for a horizontal conveyor and a tilted conveyor 10 as shown in FIGS. 1–3. The feed rate of the carrots to each conveyor was about 3000 pounds per hour. Using a horizontal conveyor, only about 2640 pounds per hour were properly cut. The tilted conveyor 10 with a conveyor angle $\alpha_1$ of about 45°, a pocket angle $\alpha_2$ of about 30°, and a guide angle $\alpha_3$ of about 6° produced about 2900 pounds per hour of properly cut carrots. This represents a significant increase in efficiency. The use of gravity to assist the feeding of the carrots to the conveyor 10 and collection of the misted carrots in the recycle area 44 cuts operating costs by avoiding additional drive mechanisms for transferring the carrots to the conveyor 10 and for brushing off the misfed carrots.

The above-described arrangements of apparatus and methods are merely illustrative of applications of the principles of this invention and many other embodiments and modifications may be made without departing from the spirit and scope of the invention as defined in the claims. For instance, the apparatus may be tilted by only one of the two angles, $\alpha_1$, $\alpha_2$. The tilting by the conveyor angle al enhances the feed momentum of the carrots 17 that do not fall within the pockets 18 to carry them across the width of the conveyor 10 to the recycle area 14. The tilting by the pocket angle $\alpha_2$ utilizes gravity to cause those carrots to fall off from the conveyor 10 away from the cutter 14. Thus, the tilting of the apparatus by one of the two angles, $\alpha_1$, $\alpha_2$, may be sufficient to prevent misfed carrots from reaching the cutter 14 and allow them to be collected in the recycle area 44. Moreover, the feed chute 12 may be nonparallel to the conveyor 10. The feed chute 12 may be rotated by a chute angle from the horizontal plane 26 which is different from the compound angle of rotation of $\alpha_1$ and $\alpha_2$ for the conveyor 10. The feed chute 12 and the conveyor 10 may include portions that are nonplanar.

What is claimed is:

1. A method for conveying food items on a conveyor having a plurality of pockets to a cutter for cutting, the method comprising:

transferring food items in a feed direction to the pockets of the conveyor which are separated by pocket dividers;

moving the conveyor in a conveyor direction to the cutter, the conveyor direction being nonparallel to the feed direction;

tilting the conveyor at an angle measured from a horizontal plane to receive the food items in the feed direction with the conveyor at the tilted angle; and providing an obstruction having generally a same height as the pocket dividers and disposed along a side of the conveyor to prevent food items received into the pockets from sliding off from the conveyor, wherein the obstruction does not rise in height above the pocket dividers so that food items which are not received into the pockets tend to fall off from the conveyor by gravity away from the cutter.

2. The method of claim 1 wherein the feed direction is substantially perpendicular to the conveyor direction.

3. The method of claim 1 wherein the conveyor is tilted at an angle measured from the horizontal plane so that food items which are not received into the pockets tend to fall off from the conveyor by gravity in a direction which is opposite from the conveyor direction.

4. The method of claim 1 wherein the conveyor is tilted at an angle measured from the horizontal plane so that food items which are not received into the pockets tend to fall off from the conveyor by gravity in a direction which is substantially parallel to the feed direction.

5. The method of claim 1 wherein the conveyor is tilted at an angle measured from the horizontal plane so that food items which are not received into the pockets tend to fall off from the conveyor by gravity in a slanted direction away from the conveyor direction and toward the feed direction.

6. The method of claim 1 further comprising guiding the food items into the plurality of pockets of the conveyor.

7. The method of claim 6 wherein the step of guiding the food items comprises guiding the food items into the plurality of pockets of the conveyor at a guide angle measured from a pocket direction along which the pockets are oriented, the guide angle being counter-clockwise relative to a downward direction when viewed by an observer looking in the downward direction, the downward direction being substantially perpendicular to a plane on which both the conveyor direction and the pocket direction lie.

8. The method of claim 7 wherein the guide angle is about 4°–10°.

9. The method of claim 1 wherein the food items are transferred to the pockets of the conveyor by gravity.

10. A method for conveying food items on a conveyor having a plurality of pockets to a cutter for cutting, the method comprising:

transferring rood items in a feed direction to the pockets of the conveyor;

moving the conveyor in a conveyor direction to the cutter, the conveyor direction being nonparallel to the feed direction;

tilting the conveyor at an angle measured from a horizontal plane so that food items which are not received into the pockets tend to fall off from the conveyor by gravity away from the cutter; and guiding the food items into the plurality of pockets of the conveyor;

wherein the step of guiding the food items comprises guiding the food items into the plurality of pockets of the conveyor at a guide angle measured from a pocket direction along which the pockets are oriented, the guide angle being counter-clockwise relative to a downward direction when viewed by an observer looking in the downward direction, the downward direction being substantially perpendicular to a plane on which both the conveyor direction and the pocket direction lie; and wherein the guide angle is about 4°–10°.

11. A food processing apparatus for conveying food items to a cutter for cutting comprising:

a cutter;

a conveyor having a plurality of pockets separated by packet dividers for receiving load items and configured to move the food items in a conveyor direction to the cutter; and a stationary feed chute disposed adjacent a side of the conveyor and being disposed at a chute angle measured from a horizontal plane for transferring the food items downward to the conveyor by gravity, wherein the conveyor is disposed at a conveyor angle measured from the horizontal plane at a location adjacent the stationary feed chute to receive the food items from the stationary feed chute with the conveyor at the conveyor angle, the conveyor angle being counter-clockwise relative to the conveyor direction when viewed by an observer looking in the conveyor direction, and wherein the conveyor includes an obstruction having generally a same height as the pocket dividers and disposed along another side opposite from the stationary feed chute to prevent food items received into the pockets from sliding off from the conveyor, and wherein the obstruction does not rise in height above the pocket dividers so that food items which are not received into the pockets of the conveyor tend to fall off from the conveyor by gravity.

12. The apparatus of claim 11 wherein the conveyor angle is about 15°–70°.

13. The apparatus of claim 12 wherein the conveyor angle is about 40°–45°.

14. The apparatus of claim 11 wherein the plurality of pockets in the conveyor are oriented generally in a transverse direction which is substantially perpendicular to the conveyor direction, the food items being received into and aligned in the pockets generally in the transverse direction.

15. The apparatus of claim 14 wherein the conveyor is further disposed such that the conveyor direction is at a transverse angle measured from the horizontal plane, the traverse angle being counter-clockwise relative to the transverse direction when viewed by an observer looking in the transverse direction from a side of the conveyor where the stationary feed chute is located.

16. The apparatus of claim 15 wherein the transverse angle is about 15°–45°.

17. The apparatus of claim 16 wherein the transverse angle is about 30°.

18. The apparatus of claim 14 wherein the feed chute includes a guide member for guiding the food items to the conveyor at a guide angle measured from the transverse direction, the guide angle being counter-clockwise relative to a downward direction which is substantially perpendicular to a plane on which both the conveyor direction and the transverse direction lie.

19. The apparatus of claim 18 wherein the guide angle is about 4°–10°.

20. The apparatus of claim 11 wherein the chute angle is substantially identical to the conveyor angle.

21. A food processing apparatus for conveying food items to a cutter for cuffing comprising:

a cutter;

a conveyor having a plurality of pockets separated by pocket dividers for receiving food items and configured to move the food items in a conveyor direction to the cutter;

a stationary feed chute disposed adjacent a side of the conveyor and being disposed at a chute angle measured from a horizontal plane for transferring the food items downward to the conveyor by gravity; and a transition chute coupled with the feed chute and disposed generally above to conveyor for guiding the food items into the plurality of pockets of the conveyor;

wherein the conveyor is disposed at a conveyor angle measured from the horizontal plane, the conveyor angle being counter-clockwise relative to the conveyor direction when viewed by pi observer looking in the conveyor direction, and wherein the conveyor includes an obstruction having generally a same height 28 the pocket dividers and disposed along another side opposite from the stationary feed chute to prevent food items received into the pockets from sliding off from the conveyor, and wherein the obstruction does not rise in height above the pocket dividers so that food items which are not received into the pockets of the conveyor tend to fall off from the conveyor by gravity.

22. The apparatus of claim 21 wherein the transition chute includes a convex surface for guiding the food items into the plurality of pockets of the conveyor.

23. An apparatus for conveying food items to a cutter, the apparatus comprising:
   a cutter;
   a conveyor having a plurality of slots separated by dividers for receiving food items and configured to move the food items upward in a conveyor direction to the cutter, the plurality of slots being oriented generally in a transverse direction which is substantially perpendicular to the conveyor direction, the food items being received into and aligned in the slots generally in the transverse direction; and
   a stationary feed chute disposed adjacent a side of the conveyor for transferring the food items to the conveyor,
   wherein the conveyor is disposed at a transverse angle measured from a horizontal plane at a location adjacent the stationery feed chute to receive the food items from the stationary feed chute with the conveyor at the conveyor angle, the transverse angle being counter-clockwise relative to the transverse direction when viewed by an observer looking in the traverse direction from a side of the conveyor where the stationary feed chute is located, wherein the conveyor includes an obstruction having generally a same height as the pocket dividers and disposed along another side opposite from the stationery feed chute to prevent food items received into the pockets from sliding off from the conveyor, and wherein the obstruction does not rise in height above the dividers so that food items which are not received into the slots of the conveyor tend to fall off from the conveyor by gravity.

24. The apparatus of claim 23 wherein the transverse angle is about 15°–45°.

25. The apparatus of claim 24 wherein the transverse angle is about 30°.

26. The apparatus of claim 23 wherein the conveyor is further disposed such that the transverse direction is at a conveyor angle measured from the horizontal plane, the conveyor angle being counter-clockwise relative to the conveyor direction when viewed by an observer looking in the conveyor direction.

27. The apparatus of claim 26 wherein the conveyor angle is about 15°–70°.

28. The apparatus of claim 27 wherein the conveyor angle is about 40°–45°.

29. The apparatus of claim 23 wherein the feed chute includes a guide member for guiding the food items to the conveyor at a guide angle measured from the transverse direction, the guide angle being counter-clockwise relative to a downward direction which is substantially perpendicular to a plane on which both the conveyor direction and the transverse direction lie.

30. The apparatus of claim 29 wherein the guide angle is about 4°–10°.

31. An apparatus for conveying food items to a cutter, the apparatus comprising:
   a cutter;
   a conveyor having a plurality of pockets separated by pocket dividers for receiving food items and configured to move the food items in a conveyor direction to the cutter, the plurality of pockets being oriented in a pocket direction which is nonparallel to the conveyor direction, the food items being received into and aligned in the pockets generally in the pocket direction; and
   means for transferring the food items to the conveyor,
   wherein the conveyor 18 disposed at an angle measured from a horizontal plane at a locution adjacent the stationary feed chute to receive the food items from the stationary feed chute with the conveyor at the conveyor angle, wherein the conveyor includes an obstruction having generally a same height as the pocket dividers and disposed along another side opposite from the means for transferring the food items to the conveyor to prevent food items received into the pockets from sliding off from the conveyor, and wherein the obstruction does not rise in height above the pocket dividers so that food items which pro not received into the pockets tend to fall off from the conveyor by gravity away from the cutter.

32. The apparatus of claim 31 wherein the angle of the conveyor is selected so that food items which are not received into the pockets of the conveyor tend to fall off from the conveyor by gravity generally in a direction which is opposite from the conveyor direction.

33. The apparatus of claim 31 wherein the angle of the conveyor is selected so that food items which are not received into the pockets of the conveyor tend to fall off from the conveyor by gravity generally in a direction which is substantially parallel to the pocket direction.

34. The apparatus of claim 31 wherein the angle of the conveyor is selected so that food items which are not received into the pockets of the conveyor tend to fall off from the conveyor by gravity generally in a slanted direction away from the conveyor direction and toward the pocket direction.

35. The apparatus of claim 31 further comprising means for guiding the food items to the conveyor at a guide angle measured from the pocket direction, the guide angle being counter-clockwise relative to a downward direction when viewed by an observer looking in the downward direction, the downward direction being substantially perpendicular to a plane on which both the conveyor direction and the pocket direction lie.

36. The apparatus of claim 31 further comprising means for guiding the food items into the plurality of pockets of the conveyor.

37. A food processing apparatus for conveying food items to a cutter for cutting comprising:
   a cutter;
   a conveyor having a plurality of pockets for receiving food items and a configured to move the food items in a conveyor direction to the cutter; and
   a stationary feed chute disposed adjacent a side of the conveyor and being disposed at a chute angle measured from a horizontal plane for transferring the food items downward to the conveyor by gravity;
   wherein the conveyor is disposed at a conveyor angle measured from the horizontal plan; the conveyor angle being counter-clockwise relative to the conveyor direction when viewed by an observer looking in the conveyor direction and the conveyor is substantially unobstructed along another side opposite from the stationary feed chute so that food items which are got received into the pockets of the conveyor tend to fall off from the conveyor by gravity;

wherein the plurality of pockets in the conveyor are oriented generally in a transverse direction which is substantially perpendicular to the conveyor direction, the food items being received into and aligned in the pockets generally in the transverse direction; and wherein the feed chute includes a guide member for guiding the food items to the conveyor at a guide angle measured from the transverse direction, the guide angle being counter-clockwise relative to a downward direction which is substantially perpendicular to a plane on which both the conveyor direction and the transverse direction lie;

wherein the guide angle is about 4°–10°.

38. An apparatus for conveying food items to a cutter, the apparatus comprising:

a cutter;

a conveyor having a plurality of slots for receiving food items and configured to move the food items upward in a conveyor direction to the cutter, the plurality of slots being oriented generally in a transverse direction which is substantially perpendicular to the conveyor direction, the food items being received into and aligned in the slots generally in the transverse direction; and a stationary feed chute disposed adjacent a side of the conveyor for transferring the food items to the conveyor;

wherein the conveyor is disposed at a transverse angle measured from a horizontal plane, the transverse angle being counter-clockwise relative to the transverse direction when viewed by an observer looking in the transverse direction from a aide of the conveyor where the stationary feed chute is located so that food items which are not received into the slots of the conveyor tend to fall off from the conveyor by gravity;

wherein the feed chute includes a guide member for guiding the food items to the conveyor at a guide angle measured from the transverse direction, the guide angle being counter-clockwise relative to a downward direction which is substantially perpendicular to a plane on which both the conveyor direction and the transverse direction lie; and wherein the guide angle is about 4°–10°.

* * * * *